United States Patent
Cheong et al.

(10) Patent No.: US 8,861,470 B2
(45) Date of Patent: Oct. 14, 2014

(54) APPARATUS AND METHOD FOR ALLOCATING RESOURCE IN COMMUNICATION SYSTEM

(71) Applicant: Electronics and Telecommunications Research Institute, Daejeon (KR)

(72) Inventors: Min-Ho Cheong, Daejeon (KR); Hee-Jung Yu, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 111 days.

(21) Appl. No.: 13/722,996

(22) Filed: Dec. 20, 2012

(65) Prior Publication Data

US 2013/0188572 A1 Jul. 25, 2013

(30) Foreign Application Priority Data

Dec. 20, 2011 (KR) .................... 10-2011-0138622

(51) Int. Cl.
- *H04W 4/00* (2009.01)
- *H04W 72/04* (2009.01)
- *H04W 16/14* (2009.01)
- *H04W 84/12* (2009.01)

(52) U.S. Cl.
CPC .............. *H04W 72/04* (2013.01); *H04W 16/14* (2013.01); *H04W 84/12* (2013.01)
USPC ............................................... 370/329

(58) Field of Classification Search
USPC .................................. 370/328–339
See application file for complete search history.

(56) References Cited

U.S. PATENT DOCUMENTS

| 8,638,739 | B2 * | 1/2014 | Oh et al. ............... | 370/329 |
|---|---|---|---|---|
| 2013/0242762 | A1 * | 9/2013 | Bennett et al. ........ | 370/252 |
| 2014/0003353 | A1 * | 1/2014 | Stephens et al. ....... | 370/329 |
| 2014/0086212 | A1 * | 3/2014 | Kafle et al. ............ | 370/331 |

FOREIGN PATENT DOCUMENTS

JP 2000-106696 A 4/2000

* cited by examiner

*Primary Examiner* — Frank Duong

(57) ABSTRACT

A resource allocation apparatus in a communication system includes an identification unit configured to identify a new frequency band for transmission and reception of data between a plurality of terminals and a first access point, and identify a first frequency band which is being used by a second access point in the new frequency band; a setting unit configured to divide the new frequency band into sub bands of a basic frequency band, and set priorities of the sub bands; and an allocation unit configured to allocate the sub bands in correspondence to the priorities, for transmission and reception of data between the plurality of terminals and the first access point.

20 Claims, 4 Drawing Sheets

APPARATUS AND METHOD FOR ALLOCATING RESOURCE IN COMMUNICATION SYSTEM

CROSS-REFERENCE TO RELATED APPLICATION

The present application claims priority of Korean Patent Application No. 10-2011-0138622 filed on Dec. 20, 2011, which is incorporated herein by reference in its entirety.

BACKGROUND OF THE INVENTION

1. Field of the Invention

Exemplary embodiments of the present invention relate to a communication system, and, more particularly, to an apparatus and a method for allocating resources in a communication system, in which a frame is effectively configured in consideration of wireless transmission in a new frequency band and the new frequency band is allocated to transmit and receive data through the configured frame.

2. Description of Related Art

In a current communication system, research for providing various qualities of service (hereinafter, referred to as 'QoS') to users at a high transmission rate has been actively conducted. In a wireless local area network (hereinafter, referred to as 'WLAN') system as an example of such a communication system, research for methods for stably transmitting large capacity data at a high speed through limited resources has been actively conducted. In particular, in a communication system, research for data transmission through wireless channels has been conducted. Recently, methods for the WLAN system to normally transmit and receive large capacity data by effectively using limited wireless channels have been suggested.

Meanwhile, in a current communication system, in order to efficiently transmit larger capacity data, research for a new frequency band which is not used by legacy devices for data transmission and reception in an existing communication system has been conducted. In particular, research for data transmission and reception in such a new frequency band has been conducted.

However, in the current communication system, no concrete method for allocating a new frequency band which is not used by legacy devices frequency band to transmit and receive data in the new frequency band has been suggested.

As a consequence, in order to normally transmit and receive data at a high speed through a new frequency band in a communication system, for example, a WLAN system, methods for configuring a frame in a new frequency band and efficiently allocating resources of the new frequency band to normally transmit and receive data through the frame configured in this way are demanded in the art.

SUMMARY OF THE INVENTION

Embodiments of the present invention are directed to an apparatus and a method for allocating resources in a communication system.

Also, embodiments of the present invention are directed to an apparatus and a method for allocating resources of a new frequency band in a communication system to configure a frame in the new frequency band and normally transmit and receive data at a high speed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a resource allocation apparatus in a communication system includes: an identification unit configured to identify a new frequency band for transmission and reception of data between a plurality of terminals and a first access point, and identify a first frequency band which is being used by a second access point in the new frequency band; a setting unit configured to divide the new frequency band into sub bands of a basic frequency band, and set priorities of the sub bands; and an allocation unit configured to allocate the sub bands in correspondence to the priorities, for transmission and reception of data between the plurality of terminals and the first access point.

In accordance with another embodiment of the present invention, a resource allocating method in a communication system includes: identifying a new frequency band for transmission and reception of data between a plurality of terminals and a first access point, and identifying a first frequency band which is being used by a second access point in the new frequency band; dividing the new frequency band into sub bands of a basic frequency band, and setting priorities of the sub bands; and allocating the sub bands in correspondence to the priorities, for transmission and reception of data between the plurality of terminals and the first access point.

DESCRIPTION OF SPECIFIC EMBODIMENTS

Figure 1:
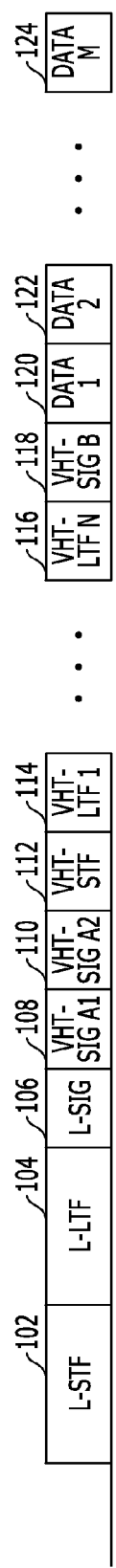
FIGS. 1 to 3 diagrams schematically showing the structures of a frame in a communication system in accordance with embodiments of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention suggests an apparatus and a method for allocating resources in a communication system, for example, a wireless local area network (hereinafter, referred to as 'WLAN') system. While the WLAN system will be exemplarily described in embodiments of the present invention, the apparatus and the method for allocating resources suggested in the present invention may be applied to other communication systems.

Embodiments of the present invention suggest an apparatus and a method for allocating resources in a new frequency band in a communication system, which is not used by legacy devices in an existing communication system. In embodiments of the present invention, a frame in a new frequency band is configured, and, in order to normally transmit and receive large capacity data in the new frequency band using such a frame, the new frequency band is efficiently allocated.

Further, in embodiments of the present invention, in a communication system, for example, a WLAN system, a frame is configured in a new frequency band which is used by legacy devices in an existing WLAN system, and, in order for transmission and reception of data through the frame between base stations, for example, access points (hereinafter, referred to as 'APs'), and a plurality of terminals, for example, stations (hereinafter, referred to as 'STAs'), resources are allocated, that is, the new frequency band is allocated to the APs and the STAs. In the embodiments of the present invention, in the case where the APs and the STAs transmit and receive data through the frame in the new frequency band as described above, the new frequency band is allocated to the APs and the STAs to minimize interference in the new frequency band.

Further, in embodiments of the present invention, in a communication system, a frame is configured in a new frequency band which is not used by legacy devices in the IEEE 802.11a system, the IEEE 802.11n system or the IEEE 802.11ac system as an example of an existing WLAN system, and the new frequency band is allocated to APs and STAs which are included in a new WLAN system different from the existing WLAN system, through the frame configured in this way while minimizing interference between APs and STAs included in the existing WLAN system. Here, in embodiments of the present invention, in an overlapping basic service set (hereinafter, referred to as an 'OBSS') in which a basic service set (hereinafter, referred to as an 'BSS') according to the existing WLAN system (for example, the IEEE 802.11a system, the IEEE 802.11n system or the IEEE 802.11ac system) and a BSS according to the different new WLAN system overlap with each other, in the case where data are transmitted and received between the APs and STAs included in the existing WLAN system and the different new WLAN system, the new frequency band is allocated to the different new WLAN system, that is, the APs and the STAs included in the different new WLAN system, while minimizing interference in the new frequency band between the existing WLAN system and the different new WLAN system.

In such a communication system in accordance with the embodiment of the present invention, wireless transmission in the new frequency band means wireless transmission in a frequency band which is different from the 2.4 GHz or 5 GHz band used in the existing WLAN system. Therefore, in the case where the frame structure of the IEEE 802.11ac system is used as it is in the embodiment of the present invention in which wireless transmission is implemented in the new frequency band, data processing rate is likely to deteriorate due to a substantial unnecessary overhead. For example, in the IEEE 802.11ac system, in order to maintain compatibility with the IEEE 802.11a system and the IEEE 802.11n system which are already defined in the same 5 GHz band, additional signals and information are included. However, in the case where the frame structure of the IEEE 802.11ac system is used in the new frequency band in accordance with the embodiment of the present invention, configuration of an efficient frame is possible because additional signals and information are not needed for such compatibility. Further, in the case where a new transmission scheme and a new data transmission rate are defined, bit allocation of control information may be changed.

In the frame structure of the above-described IEEE 802.11ac system, after a legacy short training field (L-STF), a legacy long training field (L-LTF) and a legacy signal field (L-SIG) are first defined in order for compatibility with the IEEE 802.11a system and the IEEE 802.11n system which use the same 5 GHz band, a very high throughput signal field (VHT-SIG) in which the control information of a frame actually used in the IEEE 802.11ac system is included, a very high throughput short training field (VHT-STF) for automatic gain control, a very high throughput long training field (VHT-LTF) for channel estimation, and a data field in which data to be actually transmitted are included, are defined.

The L-STF, L-LTF and L-SIG are fields which are defined for compatibility with the IEEE 802.11a system and the IEEE 802.11n system. Thus, in a system which does not use the 5 GHz band, the fields for the compatibility, that is, the L-STF, L-LTF and L-SIG, serve as unnecessary overheads. Hence, in the embodiment of the present invention, a novel frame structure, which reduces an overhead and includes new control information needed in a new system using a new frequency band, is configured.

The IEEE 802.11ac system enables data transmission of a G bps level while maintaining compatibility with the IEEE 802.11a system and the IEEE 802.11n system in the 5 GHz band. In particular, the IEEE 802.11ac system supports bandwidths of 20 MHz, 40 MHz, 80 MHz and 160 MHz, and transmits maximum 8 data streams using a multiple transmission and reception antenna technology, wherein data are transmitted by configuring a frame to maintain compatibility with other systems as described above. Hereinbelow, a frame structure in a communication system in accordance with an embodiment of the present invention will be described in detail with reference to FIGS. 1 to 3.

FIG. 1 is a diagram schematically showing a frame structure in a communication system in accordance with an embodiment of the present invention. FIG. 1 is a diagram schematically showing the frame structure of the IEEE 802.11ac system in the communication system in accordance with the embodiment of the present invention.

Referring to FIG. 1, a frame of the IEEE 802.11ac system includes control fields in which control information for data transmission to and from a plurality of terminals is included, that is, an L-STF 102, an L-LTF 104, an L-SIG 106, a VHT-SIG A1 108, a VHT-SIG A2 110, a VHT-STF 112, a plurality of VHT-LTFs, for example, a VHT-LTF 1 114 and a VHT-LTF N 116, and a VHT-SIG B 118, and includes a plurality of data fields as data fields in which data to be transmitted to the plurality of terminals are included, that is, a DATA 1 120, a DATA 2 122 and a DATA M 124.

The L-STF 102 is used in signal detection, automatic gain control, frequency error estimation, frame synchronization, and so forth, and the L-LTF 104 is used in channel estimation, frequency error estimation, and so forth. Also, the L-SIG 106 includes transmission rate information, frame length information, and so forth, and the VHT-SIG A1 108 and the VHT-SIG A2 110 include information such as band widths, guard interval lengths, space-time codes, transmission rates (MCS (modulation and coding scheme) levels), data stream numbers, AID information, a used coding technology, beamforming, and so forth.

The VHT-STF 112 is used in automatic gain control, and the VHT-LTF 1 114 and the VHT-LTF N 116 are used in channel estimation. The VHT-SIG B 118 includes transmission rates (MCS levels) by user, for multi-user MIMO (multiinput multi-output), data length information, and so forth, and the DATA 1 120, the DATA 2 122 and the DATA M 124 include data which are to be actually transmitted to users, that is, STAs (stations) as terminals.

The VHT-LTF 1 114 and the VHT-LTF N 116 are determined according to the number of data streams which are to be transmitted through the frame. For example, in the case where only one stream is transmitted, only the VHT-LTF 1 114, that is, one VHT-LTF is included in the frame, and, in the case where the number of streams is 2, the VHT-LTF 1 114 and a VHT-LTF 2, that is, two VHT-LTFs are included in the frame.

The transmission rate information and frame length information of the L-SIG 106 do not actually include the information of data, and causes data transmission not to be implemented during the length of a received frame in the case where the terminals of the IEEE 802.11a system or the IEEE 802.11n system receive the corresponding frame. The transmission rate information and frame length information of the L-SIG 106 become unnecessary information in the case where compatibility with the IEEE 802.11a system or the IEEE 802.11n system is not considered. The functions of the L-STF 102 and the L-LTF 104 may be replaced by the VHT-STF 112 and the VHT-LTFs 114 and 116. In the case where compatibility is not considered as described above, the frame structure of the IEEE 802.11ac system becomes an inefficient frame structure due to the presence of an overhead. A frame structure newly configured by removing such inefficiency will be described in detail with reference to FIG. 2.

Figure 2:

FIG. 2 is a diagram schematically showing a frame structure in a communication system in accordance with another embodiment of the present invention. FIG. 2 is a diagram showing a frame structure in which compatibility with the IEEE 802.11a system or the IEEE 802.11n system is not considered and an overhead is reduced from the frame structure of the IEEE 802.11ac system shown in FIG. 1, to improve efficiency. Also, FIG. 2 is a diagram showing a new frame structure in a new frequency band in a communication system in accordance with another embodiment of the present invention, which is not used by legacy devices for transmitting and receiving data in an existing system.

Referring to FIG. 2, a frame in the new frequency band includes control fields in which control information for data transmission to and from a plurality of terminals is included, that is, a VHT-STF 202, a VHT-SIG A1 206, a VHT-SIG A2 208, a plurality of VHT-LTFs, for example, a VHT-LTF 1 204, a VHT-LTF 2 210 and a VHT-LTF N 212, and a VHT-SIG B 214, and includes a plurality of data fields as data fields in which data to be transmitted to the plurality of terminals are included, that is, a DATA 1 216, a DATA 2 218 and a DATA M 220.

The VHT-STF 202 is used in signal detection, automatic gain control, frequency error estimation, frame synchronization, and so forth, and the VHT-LTF 1 204 is used in channel estimation, frequency error estimation, and so forth. Also, the VHT-SIG A1 206 and the VHT-SIG A2 208 include information such as band widths, guard interval lengths, space-time codes, transmission rates (MCS levels), data stream numbers, AID information, a used coding technology, beamforming, application of a new transmission mode, and so forth.

Not only the VHT-LTF 1 204 but also the VHT-LTF 2 210 and the VHT-LTF N 212 are used in channel estimation, and the VHT-SIG B 214 includes transmission rates (MCS levels) by user, for multi-user MIMO, data length information, and so forth. The DATA 1 216, the DATA 2 218 and the DATA M 220 include data which are to be actually transmitted to users, that is, STAs as terminals.

In the communication system in accordance with the embodiment of the present invention, in order to transmit data using the frame in the new frequency band, the VHT-STF 202 is extended by the length of the L-STF 102 in the above-described frame of the IEEE 802.11ac system, and performs the function performed by the L-STF 102. Among the VHT-LTFs 204, 210 and 212, the VHT-LTF 1 204 as a first long training field is preferentially arranged at the front portion of the frame, that is, next to the VHT-STF 202, and the remaining N−1 number of VHT-LTFs 210 and 212 are arranged after the VHT-SIG A1 206 and the VHT-SIG A2 208. Control information for the frame which all terminals should receive is included in the VHT-SIG A1 206 and the VHT-SIG A2 208.

In the case where the communication system, which transmits and receives data using such frame in the new frequency band, supports a multi-user MIMO function, the VHT-SIG B 214, which includes the transmission rate information by user and the data length information, should be included in the frame structure in the new frequency band. In the case where the communication system does not support the multi-user MIMO function, the VHT-SIG B 214 may be omitted from the frame.

The structures of the VHT-SIG A1 206 and the VHT-SIG A2 208 are as given in Table 1.

TABLE 1

| | | | | |
|---|---|---|---|---|
| VHT-SIG A1 | B0-B1 | Bandwidth | 2-bit | Denoting 20/40/80/160 MHz by 0/1/2/3, respectively. |
| | B3 | Reservation | 1-bit | Fixing to 1 |
| | B4-B9 | Group ID | 6-bit | Including group ID information |
| | B10-21 | Nsts | 12-bit | In the case of a multi-user, denoting the numbers of streams of 4 users to 0 to 4, by 3 bits for each user. In the case of a single user, denoting 1(000) to 8(111) streams by B10 to B12, B13 to B21 including partial AID information |
| | B22 | TXOP_PS_NOT_ALLOWED | 1-bit | Indicating whether TXOP_PS can be utilized or not |
| | B23 | Reservation | 1-bit | Fixing to 1 |
| VHT-SIG A2 | B0-B1 | Short GI | 2-bit | Setting according to whether short GI is used |

TABLE 1-continued

| | | | or not |
|---|---|---|---|
| B2-B3 | Coding scheme (coding) | 2-bit | Indicating whether LDPC and BCC are used or not |
| B4-B7 | Transmission rate (MCS) | 4-bit | Defining 10 MCSs from BPSK ½ code rate to 256-QAM ⅚ code rate |
| B8 | Beamforming | 1-bit | Indicating whether beamforming is used or not |
| B9 | Reservation | 1-bit | Fixing to 1 |
| B10-B17 | CRC | 8-bit | Inserting CRC bit |
| B18-B23 | Tail | 6-bit | For tailing trellis of Viterbi decoder |

In Table 1, in the case where the number of possible bandwidths (BWs) of the communication system in accordance with the embodiment of the present invention as shown in FIG. 2, which uses the frame structure in the new frequency band, is at least 4, the region B3 of the VHT-SIG A1 206 may be additionally utilized for bandwidth information in consideration of the cases where a bandwidth is equal to or larger than 20 MHz, 40 MHz, 80 MHz and 160 MHz, for example. In the case of Nsts which denotes the number of space-time transmission streams in the VHT-SIG A1 206, maximum 4 streams are allocated to 4 users for a multi-user, and, in the case of a single user, maximum 8 streams may be allocated. In the communication system in accordance with the embodiment of the present invention as shown in FIG. 2, which uses the frame structure in the new frequency band, as can be readily seen from above descriptions, each of the numbers of streams to be allocated is decreased to a half to secure a margin of 1 bit, and the 1 bit secured in this way may be allocated to a new transmission scheme.

That is to say, in the communication system in accordance with the embodiment of the present invention as shown in FIG. 2, which uses the frame structure in the new frequency band, a transmission rate is decreased to a half through repetitive transmission and the like when compared to a conventional system, and 1 bit may be allocated to define a mode capable of increasing a communication distance.

Therefore, in the communication system in accordance with the embodiment of the present invention, 3 bits are allocated to each user in the case of a multi-user, wherein 1 bit of the 3 bits is allocated as a bit for indicating whether or not to perform repetitive transmission, and the remaining 2 bits denote the number of transmission streams. Furthermore, in the communication system in accordance with the embodiment of the present invention, even in the case of a single user, 1 bit is used to indicate whether or not to perform repetitive transmission, the remaining 2 bits define 1 to 4 transmission streams, and, in the case where an additional transmission mode is further needed, the additional transmission mode may be used by using other reserved bits.

For example, in the communication system in accordance with the embodiment of the present invention, in the case where up to a 4× repetitive transmission mode or a 6× repetitive transmission mode is defined to further extend a communication distance, up to the region B23 of the VHT-SIG A1 206 or the region B9 of the VHT-SIG A2 208 is utilized in defining a new mode. Moreover, in the communication system in accordance with the embodiment of the present invention, in the case where a mode for extending a communication distance by increasing a reception sensitivity as in repetitive transmission is used, the VHT-STF 202 and the VHT-LTFs 204, 210 and 212 are used by being extended in the lengths thereof to improve performance of initial signal detection and channel estimation. The extended VHT-LTFs 204, 210 and 212 have the same structure as an existing OFDM (orthogonal frequency division multiplexing) symbol. In the case where the VHT-LTFs 204, 210 and 212 are not extended, they have the structure of DGI (double GI (guard interval))+LTF+LTF as in the L-LTF 104, and, in the case where the VHT-LTFs 204, 210 and 212 are extended, extension is made by increasing the number of the structures of GI+LTF which are added next to the structure of DGI+LTF+LTF.

For the sake of convenience in explanation, it is assumed that, in the basic structures of the VHT-SIG A1 206 and the VHT-SIG A2 208, 52 data subcarriers, which remain by excluding guard band, DC (direct current) and pilot subcarriers from total 64 subcarriers, are used as BPSK (binary phase shift keying) ½ coding rate channel codes. According to this fact, in the communication system in accordance with the embodiment of the present invention, while 26 bits may be allocated to each OFDM symbol, only 24 bits may be allocated to each OFDM symbol by using only 48 data subcarriers as in the L-SIG 106 of the IEEE 802.11ac system.

For example, in the communication system in accordance with the embodiment of the present invention, as in the IEEE 802.11ac system, a W Hz bandwidth mode using 64 subcarriers, a 2 W Hz bandwidth mode using 128 subcarriers, a 4 W Hz bandwidth mode using 256 subcarriers and an 8 W Hz bandwidth mode using 512 subcarriers are basically present, and a W/2 Hz bandwidth mode using 32 subcarriers is additionally present. In this regard, while W=20 MHz is defined in the IEEE 802.11ac system, in the communication system in accordance with the embodiment of the present invention, a bandwidth is used by being changed so as to use a new frequency band different from that of the IEEE 802.11ac system. The bandwidth in the new frequency band is defined as W Hz.

In other words, in the communication system in accordance with the embodiment of the present invention, the VHT-SIG A1 206 and the VHT-SIG A2 208 for the W/2 bandwidth mode and the VHT-SIG A1 206 and the VHT-SIG A2 208 for the W Hz, 2 W Hz, 4 W Hz and 16 W Hz bandwidth modes are separately defined. In the communication system in accordance with the embodiment of the present invention, since the W Hz, 2 W Hz, 4 W Hz and 16 W Hz bandwidth modes are defined by defining the W Hz bandwidth mode using 64 subcarriers and then extending the W Hz bandwidth mode, the total numbers of the bits included in the VHT-SIG A1 206 and the VHT-SIG A2 208 are the same with each other. Therefore, in the communication system in accordance with the embodiment of the present invention, in the case of allocating two OFDM symbols to the VHT-SIG A1 206 and the VHT-SIG A2 208, total 52 bits or 48 bits are used to allocate control information.

Also, in the communication system in accordance with the embodiment of the present invention, because subcarriers capable of being used in the W/2 Hz bandwidth mode are decreased to ½, the number of bits capable of being allocated to each OFDM symbol is limited. Namely, in the communication system in accordance with the embodiment of the present invention, subcarriers are allocated according to the W Hz bandwidth mode using 64 subcarriers and the W/2 Hz bandwidth mode using 32 subcarriers.

That is to say, in the communication system in accordance with the embodiment of the present invention, since a difference in the numbers of information bits capable of being allocated to the VHT-SIG A1 206 and the VHT-SIG A2 208 according to bandwidths is substantial, the OFDM symbol numbers and bit allocation schemes of the VHT-SIG A1 206 and the VHT-SIG A2 208 are made different according to bandwidths.

In detail, first, in the case of the W Hz bandwidth mode, in the communication system in accordance with the embodiment of the present invention, when assuming that two OFDM symbols are used as the VHT-SIG A1 206 and the VHT-SIG A2 208, bit allocation for the 48 bits or 52 bits of the VHT-SIG A1 206 and the VHT-SIG A2 208, that is, the information included in the VHT-SIG A1 206 and the VHT-SIG A2 208, is as follows.

MCS (modulation and coding scheme): 4 bits are needed (maximum 16 cases including 10 cases of the IEEE 802.11ac system and new MCSs, in which repetitive transmission is applied to a lowest transmission rate, are denoted).

Length (packet length): At least 10 bits are needed as the length is denoted by the unit of byte (denoted in a 2 byte or 4 byte type) or by the unit of OFDM symbol (an additional bit for solving the ambiguity of the last OFDM symbol is included). Here, 12 bits are needed in the case of the IEEE 802.11a system, 16 bits are needed in the case of the IEEE 802.11n system, and 17 bits are needed in the case of the IEEE 802.11ac system.

Guard interval (guard interval length): 2, 3 or 4 types are included in a regular GI type, a short GI type, and, as the occasion demands, a shorter GI type, and 1 bit or 2 bits are needed.

BW (bandwidth): 2 bits for denoting the W Hz, 2 W Hz, 4 W Hz and 8 W Hz bandwidth modes and 1 bit for denoting the W/2 Hz bandwidth mode are added. In the case of the W/2 Hz bandwidth mode, 1 bit may not be included in BW information for automatic detection using a preamble. 2 to 3 bits are needed.

STBC (space-time block code): 1 bit is needed to indicate whether STBCs are utilized or not.

Tail: 6 bits of 0 are inserted last.

Nsts (number of space-time streams): Maximum 4 as the number of data streams to be simultaneously transmitted using MIMO may be denoted, and 2 bits are needed.

Coding scheme: 1 bit is needed to select a convolution code and a low density parity check (LDPC) code.

TXOP-PS (power save using TXOP (transmission opportunity)): 1 bit is needed to denote selection according to whether TXOP-PS is utilized or not.

CRC: 8 bits are needed to perform CRC (cyclic redundancy check) for the VHT-SIG A1 206 and the VHT-SIG A2 208 (the number of bits may be changed through change of the coding rate of the CRC).

Reserved (reserved bit): Bits left after allocation are denoted by preset numbers at preset locations.

Further, in the communication system in accordance with the embodiment of the present invention, the contents used in the IEEE 802.11 system may be changed and other contents may be added. The following information is additionally included. That is to say, the information additionally included in the VHT-SIG A1 206 and the VHT-SIG A2 208 is as follows.

Application field and QoS (quality of service) requirements.

Aggregation.

Battery power warning.

Power level.

PSMP (power save multi-poll) group.

Warning signals.

A number of parameters associated with STA access.

In other words, in the communication system in accordance with the embodiment of the present invention, the VHT-SIG A1 206 and the VHT-SIG A2 208 constituted by 48 bits or 52 bits by combining bits as described above are transmitted during 2 OFDM symbols.

Moreover, in the W/2 Hz bandwidth mode, since total 24 bit allocation is possible in the case where only 2 OFDM symbols are allocated to the VHT-SIG A1 206 and the VHT-SIG A2 208, in the communication system in accordance with the embodiment of the present invention, only essential information is allocated as follows. That is to say, the essential information included in the VHT-SIG A1 206 and the VHT-SIG A2 208 is as follows.

MCS: 4 bits.

Length: 12 bits.

Tail: 6 bits.

Parity: 1 bit (error check is performed using parity, instead of CRC)

W/2 Hz BW (or GI): 1 bit. 1 bit may be allocated to identify the W/2 Hz bandwidth mode. Since automatic detection may be implemented using a preamble structure, a guard interval length is denoted instead.

In this way, in the communication system in accordance with the embodiment of the present invention, since only the essential information of 24 bits is allocated to the VHT-SIG A1 206 and the VHT-SIG A2 208, the number of OFDM symbols is increased to 3 or 4 in the case where information is additionally needed, so that the needed information is additionally allocated as in the W Hz bandwidth mode. Further, in the communication system in accordance with the embodiment of the present invention, in the case of the W/2 Hz bandwidth mode, the lengths of the VHT-SIG A1 206 and the VHT-SIG A2 208 may be made different from packet to packet, such that the amounts of the information included in the VHT-SIG A1 206 and the VHT-SIG A2 208 are made different from each other. In this regard, in order for a reception apparatus to verify the differences in the lengths of the VHT-SIG A1 206 and the VHT-SIG A2 208 and verify the extension of the VHT-LTFs 204, 210 and 212 in the case of using repetitive transmission, the VHT-SIG A1 206 and the VHT-SIG A2 208 are modified by combining Q-BPSK and BPSK and are then transmitted. According to this fact, the reception apparatus first discriminates the W/2 Hz bandwidth mode and the W Hz, 2 W Hz, 4 W Hz and 8 W Hz bandwidth modes from each other, verifies the VHT-SIG A1 206 and the VHT-SIG A2 208 in such a way as to correspond to such discrimination, detects the numbers of OFDM symbols used in the VHT-SIG A1 206 and the VHT-SIG A2 208 even in case of the W/2 Hz bandwidth mode, and extracts the information included in the VHT-SIG A1 206 and the VHT-SIG A2 208.

Hereinbelow, a new frame structure in which a repetitive transmission scheme is considered in a communication system in accordance with an embodiment of the present invention will be described in detail with reference to FIG. 3.

Figure 3:
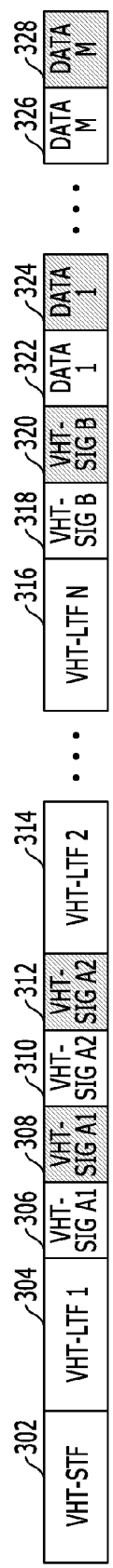

FIG. 3 is a diagram schematically showing a frame structure in a communication system in accordance with still another embodiment of the present invention. FIG. 3 is a diagram showing a new frame structure in which a repetitive transmission scheme is considered in the new frame structure for the new frequency band, shown in FIG. 2. Also, FIG. 3 is a diagram showing a new frame structure in which each of a VHT-SIG A1 and a VHT-SIG A2 includes 2 OFDM symbols and a 2× repetitive transmission scheme is exemplified.

Referring to FIG. 3, a frame in the new frequency band includes control fields in which control information for data transmission to and from a plurality of terminals is included, that is, a VHT-STF 302, two VHT-SIG A1s 306 and 308, two VHT-SIG A2s 310 and 312, a plurality of VHT-LTFs, that is, a VHT-LTF 1 304, a VHT-LTF 2 314 and a VHT-LTF N 316, and two VHT-SIG Bs 318 and 320 according to repetitive transmission, and includes a plurality of data fields as data fields in which data to be transmitted to the plurality of terminals are included, that is, two DATA is 322 and 324 and two DATA Ms 326 and 328.

The VHT-STF 302 is used in signal detection, automatic gain control, frequency error estimation, frame synchronization, and so forth, and the VHT-LTF 1 304 is used in channel estimation, frequency error estimation, and so forth. Also, the VHT-SIG A1s 306 and 308 and the VHT-SIG A2s 310 and 312 include information such as band widths, guard interval lengths, space-time codes, transmission rates (MCS levels), data stream numbers, AID information, a used coding technology, beamforming, and so forth.

Not only the VHT-LTF 1 304 but also the VHT-LTF 2 314 and the VHT-LTF N 316 are used in channel estimation, and the VHT-SIG Bs 318 and 320 include transmission rates (MCS levels) by user, for multi-user MIMO, data length information, and so forth. The DATA is 322 and 324 and the DATA Ms 326 and 328 include data which are to be actually transmitted to users, that is, STAs as terminals.

In the communication system in accordance with the embodiment of the present invention, in the case where a repetitive transmission scheme is considered, that is, a repetitive transmission mode is used, in the frame structure in the new frequency band shown in FIG. 2, not only a VHT-SIG A1 and a VHT-SIG A2 but also a VHT-SIG B repeat their respective previous symbols, that is, are consecutively repeated as in the frame structure shown in FIG. 3 and thus the two VHT-SIG A1s 306 and 308, the two VHT-SIG A2s 310 and 312 and the two VHT-SIG Bs 318 and 320 are included in the frame, and also, the data fields repeat their respective previous symbols, that is, are consecutively repeated and thus the two DATA is 322 and 324 and the two DATA Ms 326 and 328 are included in the frame. The consecutively repeated VHT-SIG A1s 306 and 308, VHT-SIG A2s 310 and 312, VHT-SIG Bs 318 and 320, DATA is 322 and 324 and DATA Ms 326 and 328 have the types of symbols which repeat their respective previous symbols, and are included in the frame through a variety of repetition schemes such as simple symbol repetition or repetition by changing the positions of subcarriers.

In the communication system in accordance with the embodiment of the present invention which uses the frame structure shown in FIG. 3, as reception sensitivity is improved, the length of the VHT-STF 302 is extended and thus signal detection performance in the reception apparatus is improved, and the lengths of the VHT-LTF2 314 and the VHT-LTF N 316 are extended as well. Namely, as aforementioned above with reference to FIG. 2, the VHT-STF 302 is extended by the length of the L-STF 102 in the above-described frame of the IEEE 802.11ac system, and performs the function performed by the L-STF 102. Among the VHT-LTFs 304, 314 and 316, the VHT-LTF 1 304 as a first long training field is preferentially arranged at the front portion of the frame, that is, next to the VHT-STF 302, and the remaining N−1 number of VHT-LTFs 314 and 316 are arranged after the VHT-SIG A1s 306 and 308 and the VHT-SIG A2s 310 and 312. Hereinbelow, allocation of a new frequency band in a communication system in accordance with an embodiment of the present invention will be described in detail with reference to FIG. 4.

Figure 4:
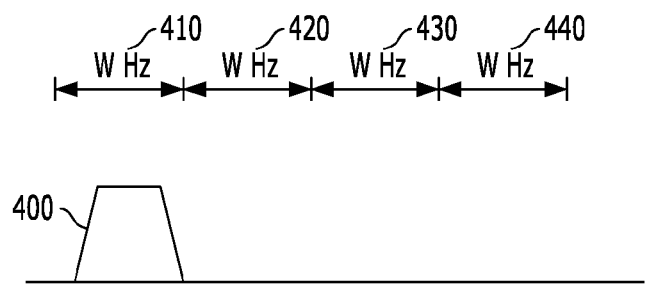
FIG. 4 is a diagram explaining allocation of a new frequency band in a communication system in accordance with an embodiment of the present invention.

FIG. 4 is a diagram explaining allocation of a new frequency band in a communication system in accordance with an embodiment of the present invention.

Referring to FIG. 4, in a communication system, after an available frequency band, for example, a new frequency band which is not used by legacy devices in an existing WLAN system is identified, a frequency band which is used by the existing WLAN system, that is, the APs included in the existing WLAN system, is identified in the identified new frequency band. Then, the communication system divides the identified new frequency band into sub bands of a basic frequency band unit, determines priorities of the divided new frequency band, that is, the sub bands, and sets priorities to the sub bands of the new frequency band. Further, the communication system allocates the sub bands to a new WLAN system which will use the new frequency band, according to the priorities, that is, allocates the sub bands for transmission and reception of data between the APs and STAs included in the new WLAN system.

The communication system sets the priorities to the sub bands of the new frequency band divided by the basic frequency band unit, in consideration of interference between the existing WLAN system and the new WLAN system in the new frequency band. Moreover, the communication system sets the priorities to the sub bands of the new frequency band divided by the basic frequency band unit, in consideration of frequency band extension of the existing WLAN system and the new WLAN system in the new frequency band. The communication system sets the priorities of the sub bands according to interference between the existing WLAN system and the new WLAN system by identifying a frequency band used by the existing WLAN system through detecting a signal of the existing WLAN system in the new frequency band. Also, the communication system sets the priorities of the sub bands according to frequency band extension by identifying frequency band extension of the existing WLAN system and the new WLAN system through capability information of the existing WLAN system and the new WLAN system.

In detail, the communication system identifies a frequency band which is used by the existing WLAN system in the new frequency band, that is, identifies a frequency band which corresponds to a primary channel 400 of the existing WLAN system. Further, the communication system divides the new frequency band into basic frequency bands, for example, basic frequency bands of a W Hz band, that is, divides the new frequency band into a first sub band 410, a second sub band 420, a third sub band 430 and a fourth sub band 440 as basic frequency bands of a W Hz band. For the sake of convenience in explanation, the following descriptions will be made on the assumption that a frequency band corresponding to the primary channel 400 of the existing WLAN system is the first sub band 410.

After dividing the new frequency band into the sub bands 410, 420, 430 and 440 of the basic frequency band in this way, the communication system sets priorities to the sub bands 410, 420, 430 and 440 of the basic frequency band in consideration of interference between the existing WLAN system and the new WLAN system in the new frequency band. Since the frequency band corresponding to the primary channel 400 of the existing WLAN system is the first sub band 410, the communication system sets priorities to the second sub band 420, the third sub band 430 and the fourth sub band 440 such that interference with the first sub band 410 used by the existing WLAN system is minimized. At this time, the communication system sets the priorities to the sub bands 420, 430 and 440 in correspondence to position separation distances with respect to the first sub band 410, such that interference with the first sub band 410 is minimized. Namely, the communication system sets a highest priority to the fourth sub band 440 which is separated most from the first sub band 410 and sets a lowest priority to the second sub band 420 which is most adjacent to the first sub band 410. That is to say, the communication system sets the priorities in order of the fourth sub band 440 with the highest priority, the third sub band 430 and the second sub band 420 with the lowest priority, in correspondence to adjacencies to, that is, position separation distances from the first sub band 410 used by the existing WLAN system, in consideration of interference between the existing WLAN system and the new WLAN system in the new frequency band.

Furthermore, after dividing the new frequency band into the sub bands 410, 420, 430 and 440 of the basic frequency band, the communication system sets priorities to the sub bands 410, 420, 430 and 440 of the basic frequency band, in consideration of frequency band extension of the existing WLAN system and the new WLAN system in the new frequency band. Since a frequency band corresponding to the primary channel 400 of the existing WLAN system is the first sub band 410, the communication system sets priorities to the second sub band 420, the third sub band 430 and the fourth sub band 440 in consideration of frequency band extension of the existing WLAN system and the new WLAN system.

In the case where the existing WLAN system extends from the first sub band 410 by the basic frequency band and the new WLAN system also extends by the basic frequency band, the communication system sets priorities to the sub bands 420, 430 and 440 in correspondence to such extensions of the existing WLAN system and the new WLAN system by the basic frequency band. In other words, as the existing WLAN system extends from the first sub band 410 by the basic frequency band, the communication system sets the second sub band 420 most adjacent to the first sub band 410 to a lowest priority, and as the new WLAN system extends from its allocated frequency band by the basic frequency band, the communication system sets the third sub band 430 most adjacent to the second sub band 420 set to the lowest priority, to a highest priority. Namely, after setting the third sub band 430 adjacent to an extended basic frequency band of the existing WLAN system adjacent to the first sub band 410 used by the existing WLAN system, to the highest priority, the communication systems sets priorities in order of the fourth sub band 440 and the second sub band 420, in consideration of frequency band extension of the existing WLAN system and the new WLAN system in the new frequency band.

In addition, after setting the priorities to the sub bands 420, 430 and 440 which are divided by the basic frequency band unit in the new frequency band as described above, the communication system allocates the sub bands 420, 430 and 440 which are set with the priorities, to the new WLAN system in correspondence to the priorities, that is, for transmission and reception of data between the APs and the STAs included in the new WLAN system. In the case where the new WLAN system extends by the basic frequency band as described above, the communication system allocates a sub band of a highest priority and a sub band of a next priority to the new WLAN system, or allocates the sub band of the highest priority and a sub band adjacent to the sub band of the highest priority to the new WLAN system, for transmission and reception of data between the APs and the STAs included in the new WLAN system.

For example, the communication system extends the basic frequency band of W Hz, allocates frequency bands of W Hz, W×N Hz, W×N$^2$ Hz, W×N$^3$ Hz and W×N$^4$ Hz to the new WLAN system. As described above, the communication system allocates a basic frequency band of a highest priority and sub bands of next priorities, to the new WLAN system as extended basic frequency bands, or allocates the basic frequency band of the highest priority and sub bands of the basic frequency bands adjacent to the basic frequency band of the highest priority to the new WLAN system as extended basic frequency bands. Hereinafter, a resource allocation apparatus for allocating a new frequency band in a communication system in accordance with an embodiment of the present invention will be described in detail with reference to FIG. 5.

Figure 5:
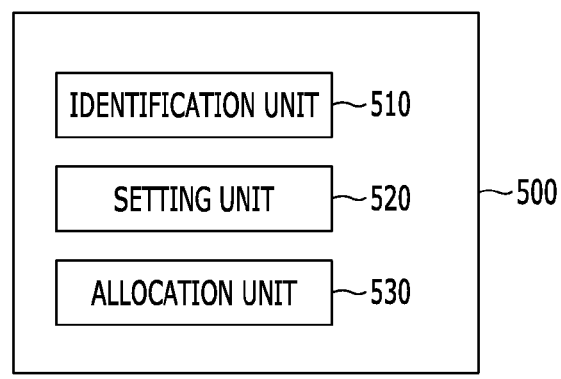
FIG. 5 is a diagram schematically showing the structure of a resource allocation apparatus in a communication system in accordance with an embodiment of the present invention.

FIG. 5 is a diagram schematically showing the structure of a resource allocation apparatus in a communication system in accordance with an embodiment of the present invention.

Referring to FIG. 5, a resource allocation apparatus 500 includes an identification unit 510 configured to identify an available frequency band, for example, a new frequency band which is not used by an existing WLAN system, and a frequency band used by the existing WLAN system in the new frequency band, a setting unit 520 configured to set priorities to basic frequency bands of the new frequency band, and an allocation unit 530 configured to allocate the new frequency band in correspondence to the set priorities.

In detail, as aforementioned above, the identification unit 510 identifies the available frequency band, for example, the new frequency band which is not used by the existing WLAN system, and identifies the frequency band used by the existing WLAN system, that is, the APs included in the existing WLAN system, in the identified new frequency band.

The setting unit 520 divides the identified new frequency band into sub bands of a basic frequency band unit, determines priorities of the divided new frequency band, that is, the sub bands, and sets the priorities to the sub bands of the new frequency band. Here, the setting unit 520 sets priorities to the sub bands of the new frequency band which is divided by the basic frequency band unit, in consideration of interference between the existing WLAN system and a new WLAN system in the new frequency band. Also, the setting unit 520 sets priorities to the sub bands of the new frequency band which is divided by the basic frequency band unit, in consideration of frequency band extension of the existing WLAN system and the new WLAN system in the new frequency band.

The allocation unit 530 allocates the sub bands set with the priorities, to the new WLAN system in correspondence to the priorities, that is, for transmission and reception of data between the APs and STAs included in the new WLAN system. Since the division of the new frequency band into the sub bands as basic frequency bands, setting of the priorities of the sub bands and allocation of the sub bands in correspondence to the priorities were described above in detail, concrete descriptions thereof will be omitted herein. Hereinafter, resource allocation of a new frequency band in a communication system in accordance with an embodiment of the present invention will be described in detail with reference to FIG. 6.

Figure 6:
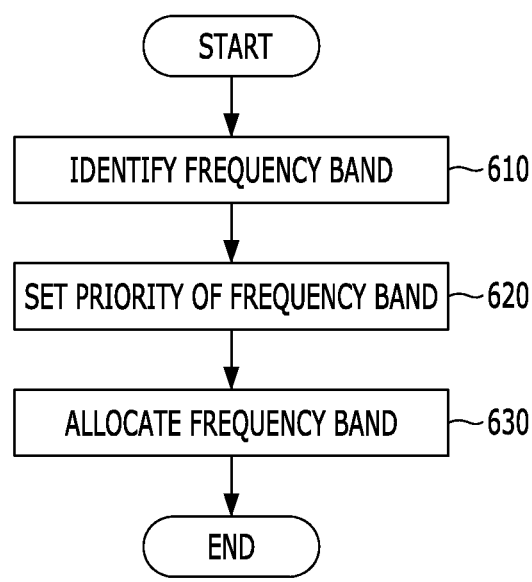
FIG. 6 is a diagram schematically showing a resource allocating procedure of the resource allocation apparatus in a communication system in accordance with an embodiment of the present invention.

FIG. 6 is a diagram schematically showing a resource allocating procedure of the resource allocation apparatus in a communication system in accordance with an embodiment of the present invention.

Referring to FIG. 6, in step 610, as described above, the resource allocation apparatus identifies an available frequency band, for example, a new frequency band which is not used by an existing WLAN system, and identifies a frequency band used by the existing WLAN system, that is, the APs included in the existing WLAN system, in the identified new frequency band.

In step 620, the resource allocation apparatus divides the identified new frequency band into sub bands of a basic frequency band unit, determines priorities of the divided new frequency band, that is, the sub bands, and sets the priorities to the sub bands of the new frequency band. Here, the resource allocation apparatus sets priorities to the sub bands of the new frequency band which is divided by the basic frequency band unit, in consideration of interference between the existing WLAN system and a new WLAN system in the new frequency band. Also, the resource allocation apparatus sets priorities to the sub bands of the new frequency band which is divided by the basic frequency band unit, in consideration of frequency band extension of the existing WLAN system and the new WLAN system in the new frequency band.

In step 630, the resource allocation apparatus allocates the sub bands set with the priorities, to the new WLAN system in correspondence to the priorities, that is, for transmission and reception of data between the APs and STAs included in the new WLAN system. Since the division of the new frequency band into the sub bands as basic frequency bands, setting of the priorities of the sub bands and allocation of the sub bands in correspondence to the priorities were described above in detail, concrete descriptions thereof will be omitted herein.

As is apparent from the above descriptions, in the communication system in accordance with the embodiments of the present invention, after an available frequency band, for example, a new frequency band which is not used by an existing WLAN system, is identified, a frequency band used by the existing WLAN system, that is, the APs included in the existing WLAN system, is identified in the identified new frequency band. The identified new frequency band is divided into the sub bands of a basic frequency band unit, priorities are set to the sub bands in consideration of interference and frequency band extension in the new frequency band, and the sub bands are allocated to a new system in correspondence to the priorities, that is, for transmission and reception of data between the APs and STAs included in the new system. Therefore, in the communication system in accordance with the embodiments of the present invention, a frame is configured in the new frequency band which is not used by the existing WLAN system, and the new frequency band is allocated such that the APs and STAs can normally transmit and receive large capacity data at a high speed through the configured frame.

In the embodiments of the present invention, in a communication system, by efficiently allocating a new frequency band in consideration of base stations, for example, APs, in an existing system, a frame may be configured in the new frequency band, and large capacity data may be normally transmitted and received at a high speed through the new frequency band.

While the present invention has been described with respect to the specific embodiments, it will be apparent to those skilled in the art that various changes and modifications may be made without departing from the spirit and scope of the invention as defined in the following claims.

What is claimed is:

1. A resource allocation apparatus in a communication system, comprising:
   an identification unit configured to identify a new frequency band for transmission and reception of data between a plurality of terminals and a first access point, and identify a first frequency band which is being used by a second access point in the new frequency band;
   a setting unit configured to divide the new frequency band into sub bands of a basic frequency band, and set priorities of the sub bands; and
   an allocation unit configured to allocate the sub bands in correspondence to the priorities, for transmission and reception of data between the plurality of terminals and the first access point.

2. The resource allocation apparatus of claim 1, wherein the setting unit sets the priorities of the sub bands in consideration of interference between the first access point and the second access point in the new frequency band.

3. The resource allocation apparatus of claim 2, wherein the setting unit sets the priorities of the sub bands in correspondence to adjacencies and position separation distances with respect to the first frequency band.

4. The resource allocation apparatus of claim 3, wherein the setting unit sets a sub band most adjacent to the first frequency band among the sub bands, to a lowest priority, and sets a sub band separated most from the first frequency band among the sub bands, to a highest priority.

5. The resource allocation apparatus of claim 1, wherein the setting unit sets the priorities of the sub bands in consideration of frequency band extension of the first access point and the second access point in the new frequency band.

6. The resource allocation apparatus of claim 5, wherein the setting unit sets a first sub band adjacent to the first frequency band among the sub bands, to a lowest priority in correspondence to frequency band extension of the second access point, and sets a second sub band adjacent to the first sub band among the sub bands, to a highest priority in correspondence to frequency band extension of the first access point.

7. The resource allocation apparatus of claim 1, wherein the allocation unit allocates the sub bands according to frequency band extension to the basic frequency band, in consideration of frequency band extension of the first access point and the second access point in the new frequency band.

8. The resource allocation apparatus of claim 7, wherein the allocation unit allocates a sub band of a highest priority and a sub band of a next priority among the sub bands.

9. The resource allocation apparatus of claim 7, wherein the allocation unit allocates a sub band of a highest priority and a sub band adjacent to the sub band of the highest priority among the sub bands.

10. The resource allocation apparatus of claim 1, wherein the first frequency band is a sub band which corresponds to a primary channel of the second access point, among the sub bands.

11. A resource allocating method in a communication system, comprising:
   identifying a new frequency band for transmission and reception of data between a plurality of terminals and a first access point, and identifying a first frequency band which is being used by a second access point in the new frequency band;

dividing the new frequency band into sub bands of a basic frequency band, and setting priorities of the sub bands; and allocating the sub bands in correspondence to the priorities, for transmission and reception of data between the plurality of terminals and the first access point.

12. The method of claim 11, wherein said setting sets the priorities of the sub bands in consideration of interference between the first access point and the second access point in the new frequency band.

13. The method of claim 12, wherein said setting sets the priorities of the sub bands in correspondence to adjacencies and position separation distances with respect to the first frequency band.

14. The method of claim 13, wherein said setting sets a sub band most adjacent to the first frequency band among the sub bands, to a lowest priority, and sets a sub band separated most from the first frequency band among the sub bands, to a highest priority.

15. The method of claim 11, wherein said setting sets the priorities of the sub bands in consideration of frequency band extension of the first access point and the second access point in the new frequency band.

16. The method of claim 15, wherein said setting sets a first sub band adjacent to the first frequency band among the sub bands, to a lowest priority in correspondence to frequency band extension of the second access point, and sets a second sub band adjacent to the first sub band among the sub bands, to a highest priority in correspondence to frequency band extension of the first access point.

17. The method of claim 11, wherein said allocating allocates the sub bands according to frequency band extension to the basic frequency band, in consideration of frequency band extension of the first access point and the second access point in the new frequency band.

18. The method of claim 17, wherein said allocating allocates a sub band of a highest priority and a sub band of a next priority among the sub bands.

19. The method of claim 17, wherein said allocating allocates a sub band of a highest priority and a sub band adjacent to the sub band of the highest priority among the sub bands.

20. The method of claim 11, wherein the first frequency band is a sub band which corresponds to a primary channel of the second access point, among the sub bands.

* * * * *